(12) United States Patent
Jang et al.

(10) Patent No.: US 7,486,357 B2
(45) Date of Patent: Feb. 3, 2009

(54) LIQUID CRYSTAL PANEL USING THIN FILM TRANSISTOR AND MANUFACTURING METHODS OF THE SAME

(75) Inventors: Seok Pil Jang, Suwon-si (KR); Hong Ryul Kim, Seoul (KR)

(73) Assignee: Iljin Display Co., Ltd., Ghungcheongbuk-Do (KR)

( * ) Notice: Subject to any disclaimer, the term of this patent is extended or adjusted under 35 U.S.C. 154(b) by 285 days.

(21) Appl. No.: 11/568,081

(22) PCT Filed: Apr. 22, 2005

(86) PCT No.: PCT/KR2005/001169

§ 371 (c)(1),
(2), (4) Date: Oct. 19, 2006

(87) PCT Pub. No.: WO2005/114315

PCT Pub. Date: Dec. 1, 2005

(65) Prior Publication Data

US 2007/0247556 A1     Oct. 25, 2007

(30) Foreign Application Priority Data

Apr. 23, 2004    (KR) ................. 2004-0028038

(51) Int. Cl.
*G02F 1/1333*    (2006.01)
*G02F 1/1343*    (2006.01)

(52) U.S. Cl. ........................ 349/111; 349/38

(58) Field of Classification Search ............ 349/19, 349/33, 38, 39, 111
See application file for complete search history.

(56) References Cited

U.S. PATENT DOCUMENTS

| | | | |
|---|---|---|---|
| 5,966,193 A | 10/1999 | Zhang et al. | |
| 6,556,265 B1* | 4/2003 | Murade | 349/111 |
| 6,661,476 B1 | 12/2003 | Abe et al. | |
| 6,714,266 B1 | 3/2004 | Ueda et al. | |
| 7,199,853 B2* | 4/2007 | Koide | 349/147 |

FOREIGN PATENT DOCUMENTS

WO    WO/03/058334    7/2003

* cited by examiner

*Primary Examiner*—Michelle R Connelly Cushwa
*Assistant Examiner*—Rhonda S Peace
(74) *Attorney, Agent, or Firm*—Pepper Hamilton LLP

(57) ABSTRACT

The present invention generally relates to a liquid crystal panel using a thin film transistor and a manufacturing method thereof, and more specifically to a liquid crystal panel using a thin film transistor and a manufacturing method thereof for improving an opening ratio by forming a storage capacitor under a channel. The present invention has suggested a method for effectively contacting an upper electrode for forming a capacitor with a lower electrode since the storage capacitor is located under the channel. Compared to a prior art in which one of storage capacitor electrodes is formed side by side with a channel of a thin film transistor, capacitor electrodes formed according to the present invention are located near to a substrate, thereby forming contact electrodes in many times without forming them one time.

21 Claims, 5 Drawing Sheets

[Fig. 1]
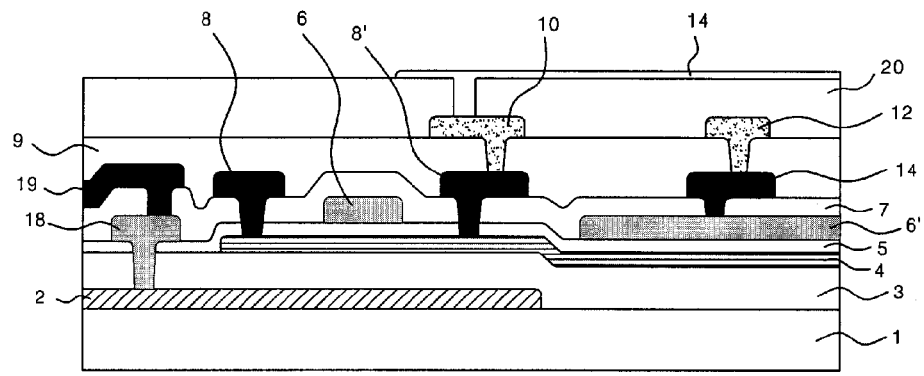
[Fig. 2]
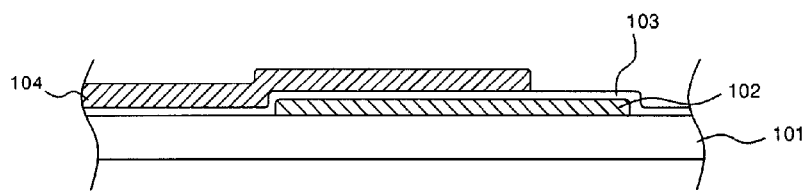
[Fig. 3]
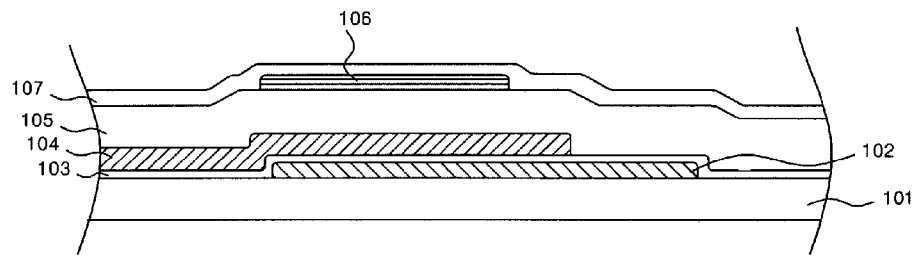
[Fig. 4]
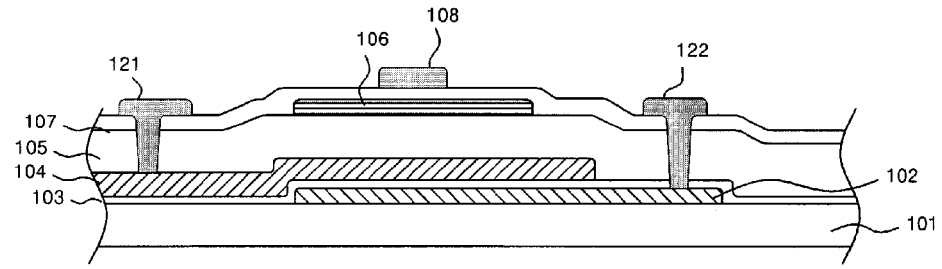
[Fig. 5]
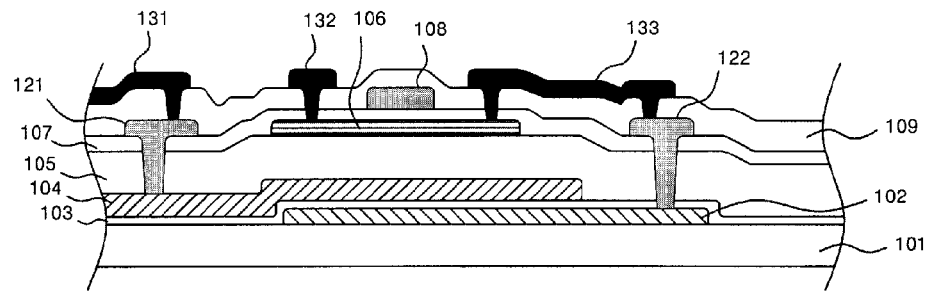

[Fig. 6]
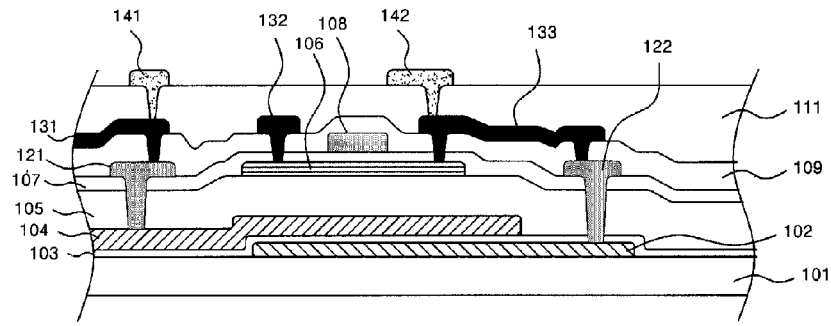
[Fig. 7]
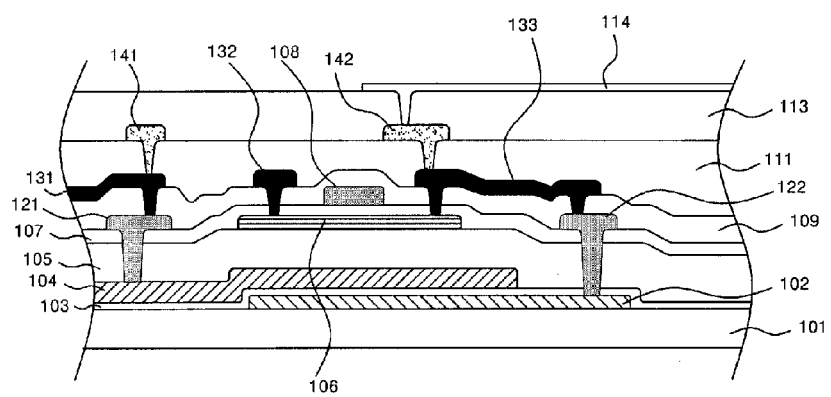
[Fig. 8]
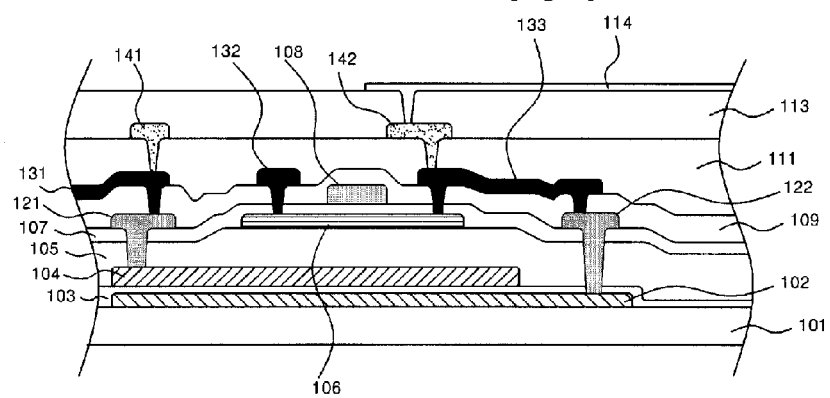
[Fig. 9]
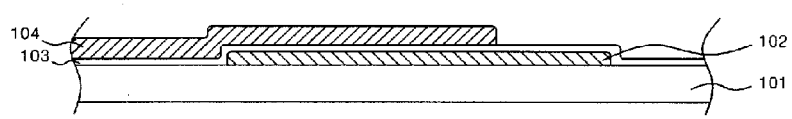
[Fig. 10]
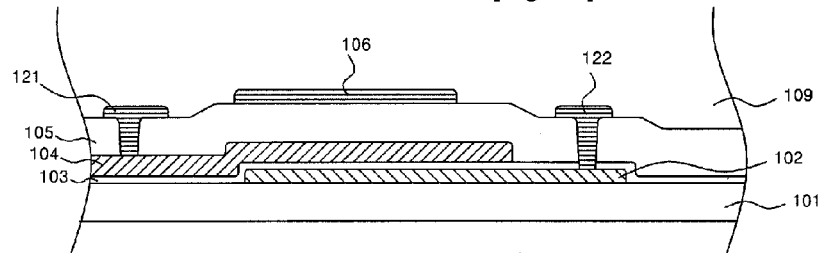

[Fig. 11]
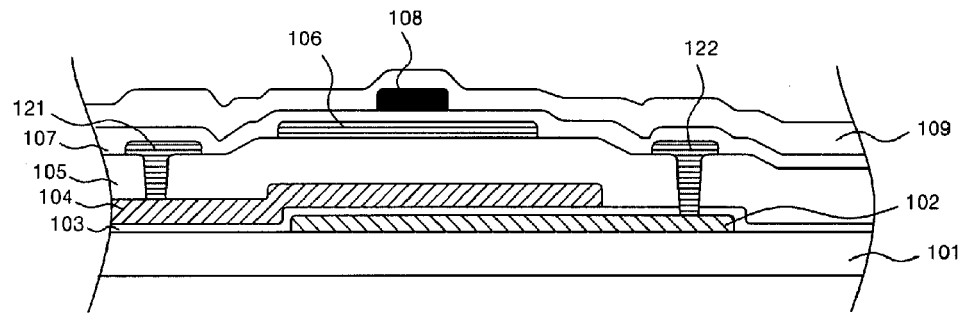
[Fig. 12]
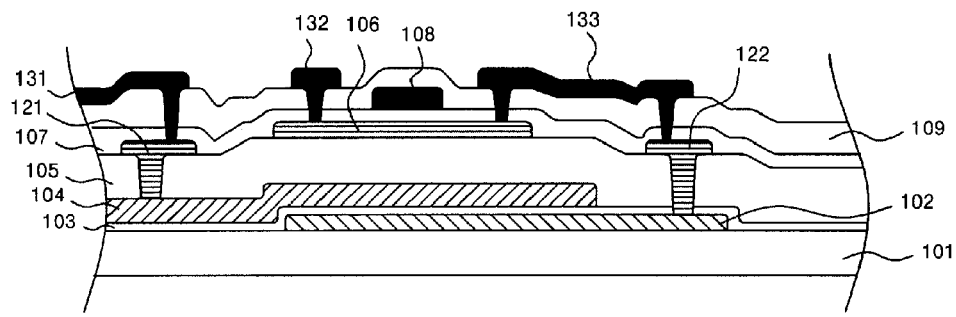
[Fig. 13]
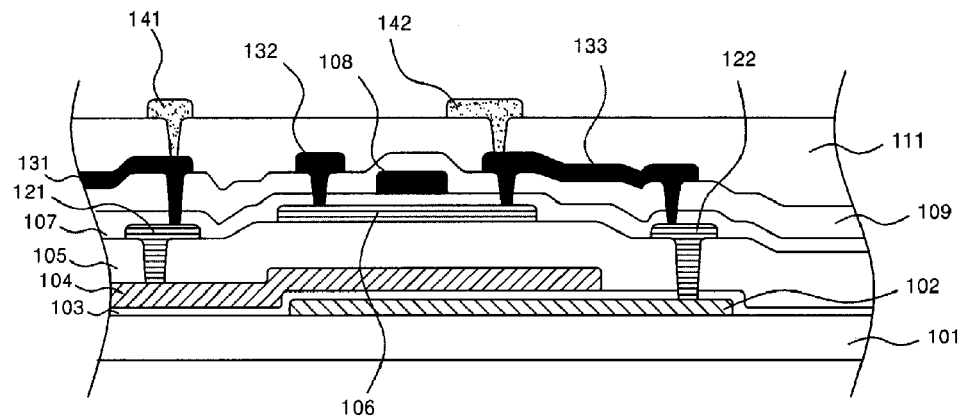
[Fig. 14]
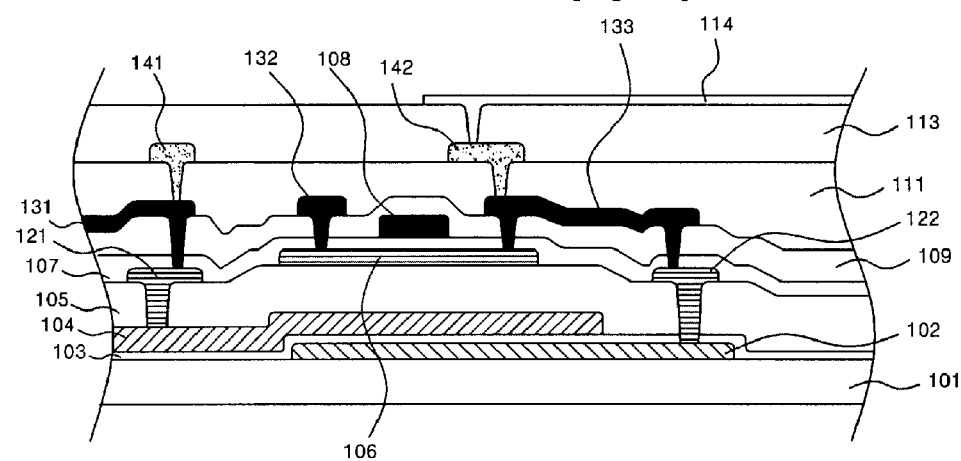

[Fig. 15]
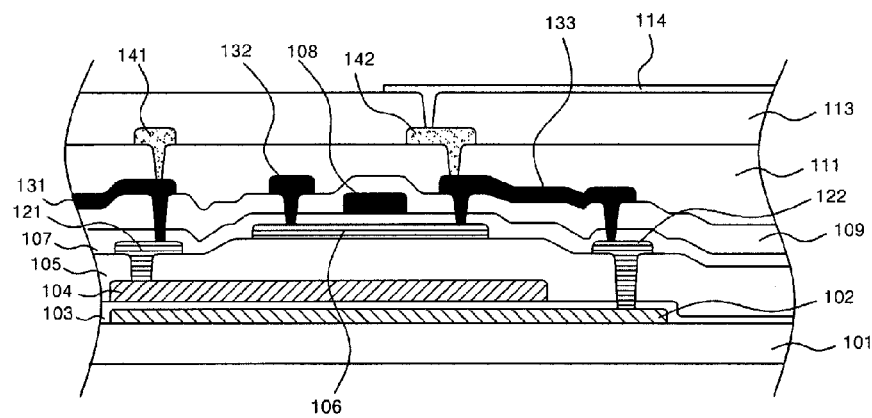
[Fig. 16]
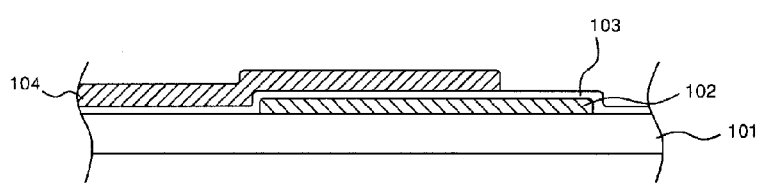
[Fig. 17]
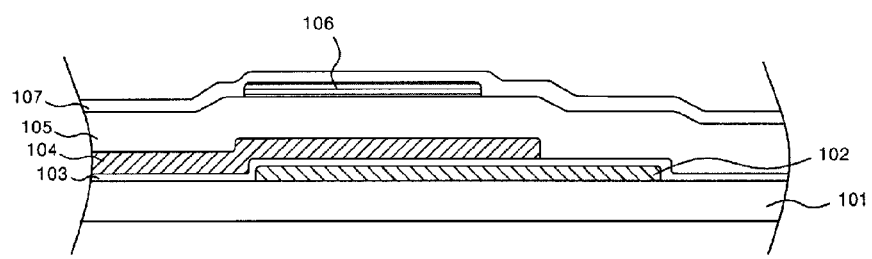
[Fig. 18]
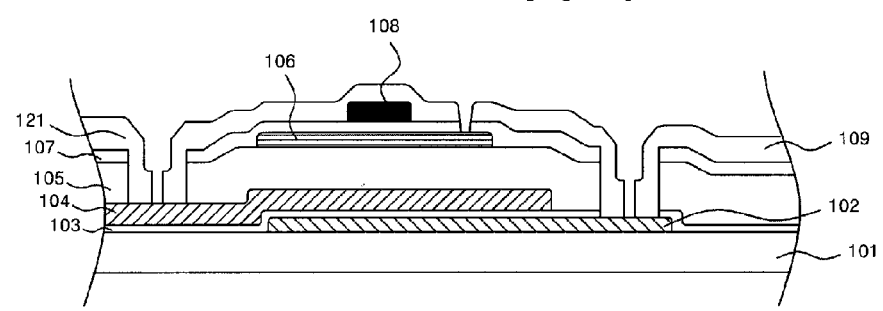
[Fig. 19]
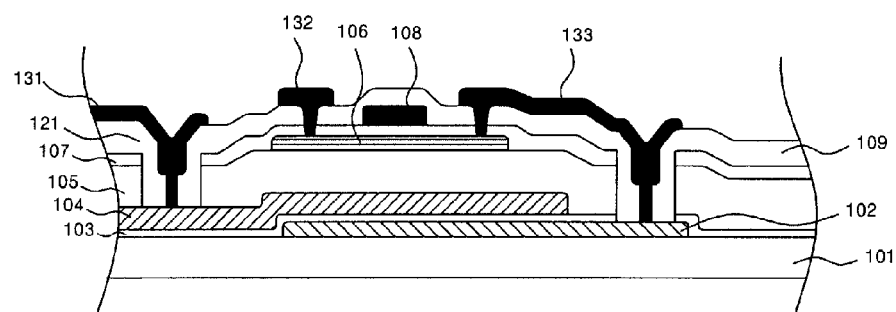

[Fig. 20]
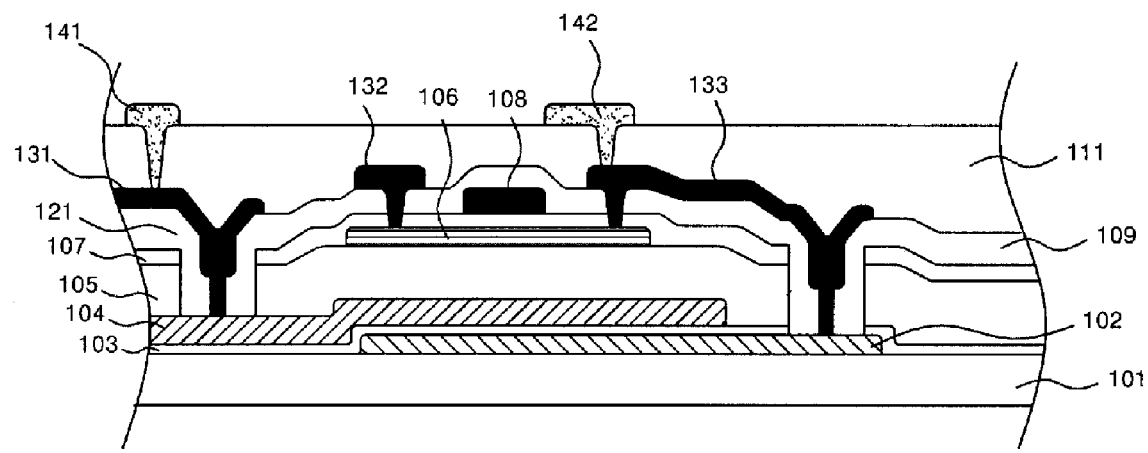
[Fig. 21]
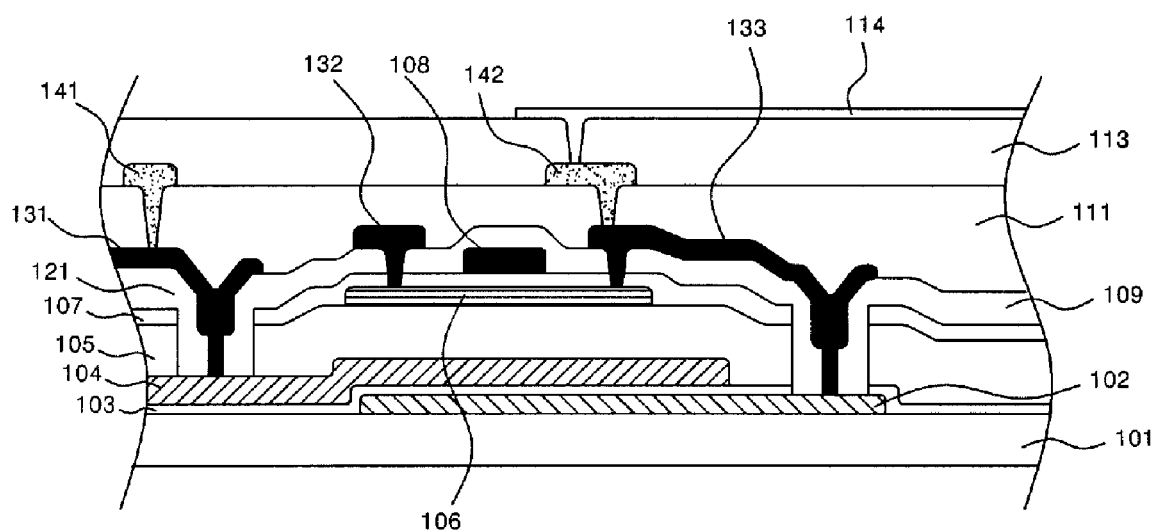
[Fig. 22]
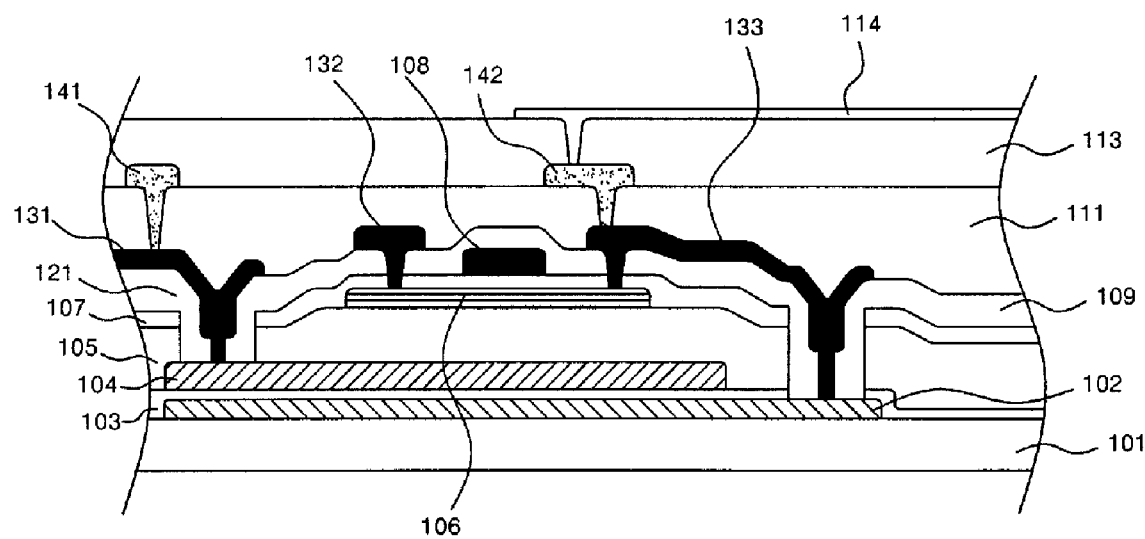

LIQUID CRYSTAL PANEL USING THIN FILM TRANSISTOR AND MANUFACTURING METHODS OF THE SAME

This application claims priority to PCT Application No. PCT/KR2005/001169 entitled "Liquid Crystal Panel Using Thin Film Transistor and Manufacturing Method of the Same," which was filed on Apr. 22, 2005 and published as WO 2005/114315, which is incorporated herein by reference in its entirety.

TECHNICAL FIELD

The present invention relates to a liquid crystal display using a high-temperature poly silicon thin film transistor (TFT-LCD) used for a projection display device and a manufacturing method thereof, and more specifically to an LCD panel using a thin film transistor and a manufacturing method thereof for improving an opening ratio of a screen by minimizing an impermeable area of light, which is occupied by a storage capacitor.

BACKGROUND ART

Generally, while images are displayed on each pixel of an LCD panel using a thin film transistor for displaying with three primary colors such as R (red), G (green), and B (blue) colors, light leakage may occur among the pixels, influencing other pixels. As a result, sharpness may deteriorate. To solve the above problem, black matrices which cut off the light leakage while cutting off light to increase pixel sharpness are disposed among the pixels, thereby increasing sharpness of a screen. Besides, when light is incoming to a channel part of the thin film transistor, the channel part of the thin film transistor creates an optical current, causing a leakage current. The leakage current can be suppressed by locating black matrices in upper and lower parts of the thin film transistor.

However, if black matrix areas get wider, brightness may deteriorate even though screen sharpness increases. An opening ratio refers to a ratio occupied by a part for transmitting light on the entire screen of the liquid crystal display using the thin film transistor, and the opening ratio is an important factor when determining performance of the LCD panel. As a certain area gets increased, the opening ratio gets reduced.

FIG. 1 is a sectional view of a lower substrate of an LCD panel using a poly silicon thin film transistor by prior art. Referring to FIG. 1, the lower substrate of the LCD panel using the thin film transistor forms black matrices (2) by depositing and patterning an opaque film on a transparent substrate (1), deposits a first interlayer insulting film (3) on the transparent substrate (1) and the black matrices (2), and forms an active layer (4) consisting of a semiconductor film by depositing and patterning the semiconductor film on the insulating film (3). In addition, a gate insulating film (5) is deposited on the active layer (4). Contact holes contacted with the black matrices (2) are formed by opening the first interlayer insulating film (3) and the gate insulating film (5), and a first connection electrode (18) is formed by injecting a conductive material into the contact holes and patterning them. Also, a gate electrode (6) and a capacitor upper electrode (6') are formed by depositing and patterning the conductive material on the gate insulating film (5). At this time, the first connection electrode (18), the gate electrode (6), and the capacitor upper electrode (6') are made of the same material. Then, impurities are injected into the active layer (4) through an ion injection process after forming the gate electrode (6), and the active layer (4) is activated.

A second interlayer insulating film (7) is deposited on the first connection electrode (18), the gate electrode (6), the capacitor upper electrode (6'), and the gate insulating film (5). The capacitor upper electrode (6'), the gate insulating film, and the active layer configure a storage capacitor for maintaining data transmitted to a liquid crystal cell for a certain time.

Contact holes connected to the first connection electrode (18) and the capacitor upper electrode (6'), respectively, are comprised by opening a predetermined area of the second interlayer insulating film (7). Contact holes contacted with the active layer are formed by opening predetermined areas of the second interlayer insulating film and the gate insulating film at an interval of the gate electrode. By filling the formed contact holes with a metal material, a first common electrode (19) connected with the first connection electrode (18), a source electrode (8) contacted with a source area of the active layer, a drain electrode (8') contacted with a drain area of the active layer, and a second common electrode (14) contacted with the capacitor upper electrode (6') are formed, respectively.

A third interlayer insulating film (9) for covering the first common electrode (19), the source electrode (8), the drain electrode (8'), the second connection electrode (14), and the second interlayer insulating film (7) is deposited and planarized. Contact holes connected with the drain electrode (8') and the second common electrode (14), respectively, are formed by opening a predetermined area of the planarized third interlayer insulating film (9), while forming a second connection electrode (10) connected with the drain electrode (8') by filling the contact holes with a conductive metal and an upper black matrix (12) filled with a light cutoff material while being patterned.

Next, contact holes contacted with the second connection electrode (10) are formed after depositing and planarizing a fourth interlayer insulating film on the upper black matrix (12), the second connection electrode (10), and the third interlayer insulating film (9). Finally, a pixel electrode (14) is formed by depositing and patterning a transparent conductive film such as ITO to complete the manufacturing process.

However, even though the LCD panel using the poly silicon thin film transistor configured like above has many strong points, there still exist several problems to be solved. For instance, in a prior LCD element using a poly silicon thin film transistor, a big size of storage capacitor should be made to improve a capacity of the storage capacitor. In this case, the storage capacity has a problem of deteriorating an opening ratio of a screen by cutting off light of a backlight as well as black matrices, resulting in a deterioration of the opening ratio.

Particularly, since a recent LCD element using a poly silicon thin film transistor has a gradually reduced pixel size to realize miniaturization and high resolution, the size of the storage capacitor may exert a severe affect upon an opening ratio of the LCD element.

DISCLOSURE OF INVENTION

Technical Problem

It is therefore an object of the present invention to provide a liquid crystal panel using a thin film transistor and a manufacturing method thereof for forming a storage capacitor lower electrode under black matrices which increase sharpness by cutting off a reflected light, and for realizing a contact structure of electrically connecting the storage capacitor lower electrode with a drain electrode without loss of an active layer.

It is another object of the present invention to provide a liquid crystal panel using a thin film transistor and a manufacturing method thereof for forming a storage capacitor lower electrode under black matrices which increase sharpness by cutting off a reflected light, and for comprising a capacitor having a high breakthrough voltage by removing a step difference of a storage capacitor upper electrode.

Technical Solution

To achieve the above object, in an LCD panel for transmitting or cutting off light through a change of a liquid crystal material array by interposing a liquid crystal material between a lower substrate consisting of a thin film transistor as a switching element and an upper substrate consisting of a common electrode, the lower substrate, comprising: a transparent substrate; a storage capacitor consisting of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film, and having an opaque conductive material for cutting off a light incident on a thin film transistor channel unit; a first interlayer insulating film deposited on the capacitor insulating film and the capacitor second electrode; a thin film transistor channel patterned on the first interlayer insulating film with a semiconductor film such as silicon; a gate insulating film covering the first interlayer insulating film and the thin film transistor channel; a gate electrode forming contact holes up to the first electrode and the second electrode from the gate insulating film, respectively, and patterned on the gate insulating film located on top of the thin film transistor channel with a first conductive material; a gate electrode patterned on the gate insulating film located on top of the thin film transistor channel with the first conductive material; a first contact electrode and a second contact electrode forming contact holes up to the first electrode and the second electrode from the gate insulating film, respectively, and electrically contacting with the capacitor first electrode and the second electrode by filling the contact holes with the first conductive material; a second interlayer insulating film deposited on the first contact electrode, the second contact electrode, the gate electrode, and the gate insulating film; a common electrode forming contact holes connected to the first contact electrode, the second contact electrode, a source and a drain of a channel, respectively, by opening a predetermined area of the second interlayer insulating film, while being contacted with the first contact electrode formed by filling the contact holes with metal, a source electrode contacted with the source of the channel, and a drain electrode simultaneously contacted with the drain of the channel and the second contact electrode; a third interlayer insulating film deposited on the common electrode, the source electrode, the drain electrode, and the second interlayer insulating film; and a pixel electrode forming contact holes contacted with the drain electrode by opening a predetermined area of the third interlayer insulating film, and consisting of a transparent conductive material electrically contacted with the drain electrode.

To accomplish the above object, in an LCD panel for transmitting or cutting off light through a change of a liquid crystal material array by interposing a liquid crystal material between a lower substrate consisting of a thin film transistor as a switching element and an upper substrate consisting of a common electrode, the lower substrate, comprising: a transparent substrate; a storage capacitor consisting of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and consisting of an opaque conductive material for cutting off a light incident on a thin film transistor channel unit; a first interlayer insulating film deposited on the capacitor insulating film and the capacitor second electrode; a thin film transistor channel forming contact holes contacted with the capacitor second electrode and the capacitor first electrode by opening a predetermined area of the first interlayer insulating film, and patterned on the first interlayer insulating film with a semiconductor film such as silicon; a first contact electrode and a second contact electrode contacted with the capacitor second electrode and the capacitor first electrode, respectively, by filling the contact holes with the semiconductor film; a gate insulating film deposited on the first contact electrode, the second contact electrode, the thin film transistor channel, and the first interlayer insulating film; a gate electrode patterned on the gate insulating film located on top of the thin film transistor channel with a first conductive material; a second interlayer insulating film deposited on the gate insulating film and the gate electrode; a common electrode forming contact holes connected to the first contact electrode, the second contact electrode, a source and a drain of a channel from the second interlayer insulating film, respectively, while being contacted with the first contact electrode formed by filling the contact holes with the conductive material, a source electrode contacted with the source, and a drain electrode electrically contacted with the drain and the second contact electrode; a third interlayer insulating film deposited on the common electrode, the source electrode, the drain electrode, and the second interlayer insulating film; and a pixel electrode forming contact holes contacted with the drain electrode by opening a predetermined area of the third interlayer insulating film, and consisting of a transparent conductive material electrically contacted with the drain electrode.

Besides, to accomplish the above object, in an LCD panel for transmitting or cutting off light through a change of a liquid crystal material array by interposing a liquid crystal material between a lower substrate consisting of a thin film transistor as a switching element and an upper substrate consisting of a common electrode, the lower substrate, comprising: a transparent substrate; a storage capacitor consisting of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material for cutting off a light incident on a thin film transistor channel unit; a first interlayer insulating film deposited on the capacitor insulating film and the capacitor second electrode; a thin film transistor channel patterned on the first interlayer insulating film with a semiconductor film; a gate insulating film deposited on the thin film transistor channel and the first interlayer insulating film; a gate electrode patterned on the gate insulating film located on top of the thin film transistor channel with a first conductive material; plural contact holes opened up to the capacitor first electrode and the capacitor second electrode from a predetermined area on the gate insulating film; a second interlayer insulating film formed in a portion of the capacitor first electrode and the second electrode while being formed on the gate electrode and the gate insulating film through the plural contact holes; contact holes formed to contact with a source and a drain of the channel from the second interlayer insulating film, a common electrode contacted with the capacitor second electrode formed by filling the contact holes contacted with the capacitor first electrode and the second electrode and the contact holes contacted with the source and the drain with a conductive material, a source electrode contacted with the source, and a drain electrode electrically contacted with the drain and the capacitor first electrode; a third interlayer insulating film deposited on the common electrode, the source electrode, the drain electrode, and the second interlayer insulating film; and a pixel electrode forming contact holes contacted with the drain electrode by opening a predetermined area of the third interlayer insulating film, and comprising a transparent conductive material electrically contacted with the drain electrode.

BRIEF DESCRIPTION OF THE DRAWINGS

The invention, together with further aspects and advantages thereof, may best be understood by reference to the following description taken in conjunction with the accompanying drawings in which:

FIG. 1 is a sectional view of a lower substrate of an LCD panel using a poly silicon thin film transistor by prior art;

FIG. 2 to FIG. 7 are cut sectional views for illustrating a manufacturing method of a lower substrate of a thin film transistor in accordance with a desired embodiment of the present invention;

FIG. 8 is a cut sectional view for illustrating a lower substrate structure of a thin film transistor by one embodiment of the present invention;

FIG. 9 to FIG. 14 are cut sectional views for illustrating a manufacturing process of a thin film transistor by one embodiment of the present invention;

FIG. 15 is a cut sectional view for illustrating a lower substrate structure of a thin film transistor by one embodiment of the present invention;

FIG. 16 to FIG. 21 are cut sectional views for illustrating a manufacturing process of a thin film transistor by one embodiment of the present invention; and FIG. 22 is a cut sectional view for illustrating a lower substrate structure of a thin film transistor by one embodiment of the present invention.

MODE FOR THE INVENTION

The present invention will now be described in detail with reference to exemplary preferred embodiments as illustrated in the accompanying drawings.

FIG. 2 to FIG. 7 are cut sectional views for illustrating a lower substrate manufacturing method of a thin film transistor in accordance with a desired embodiment of the present invention. A storage capacitor lower electrode (102) is formed by depositing and patterning a conductive film such as doped poly silicon or metal silicide on a transparent substrate (101). Next, a capacitor insulating film (103) is formed by depositing an insulating film through thermal oxidation or CVD (Chemical Vaporized Deposition), and a metal silicide film such as tungsten silicide (WSix) is deposited on the capacitor insulating film (103) while being patterned, functioning as a lower BM (Black Matrix) for cutting off a light incident on a channel unit of the thin film transistor and forming a storage capacitor upper electrode (104)(FIG. 2). Thus, the BM should have an opaque property for cutting off light as well as conductive property, being made of metal with a high fusion point or silicide film.

After depositing a first interlayer insulating film (105) on the capacitor upper electrode (104) and the capacitor insulating film (103), a channel area (106) of the thin film transistor is formed by depositing and patterning a semiconductor film such as poly silicon on the first interlayer insulating film (105). Then, a gate insulating film (107) is formed on the first interlayer insulating film (105) and the channel area (106) (FIG. 3).

A method for forming the channel area will be more specifically described as follows. The description is applied to a thin film transistor suggested in the present invention except the structure of FIG. 2. Generally, a polycrystalline silicon thin film transistor which forms the channel area (106) with polycrystalline silicon (p-Si) is mainly used for driving pixels to improve a switching speed. Such a polycrystalline silicon thin film polycrystallizes an amorphous silicon semiconductor thin film after depositing it, using an SPC (Solid Phase Crystallization) for annealing at about 500 to 1000° C., a laser crystallization using a low-fusion-point substrate by enabling crystallization at low temperature less than about 400° C., and a metal inductive crystallization using a crystal growth feature change by metal. After forming a gate electrode, parts which function as a source and a drain except a channel are doped through an ion implantation to form a source and a drain. An LDD (Lightly Doped Drain) structure is generally used for a thin film transistor for driving pixels.

Next, After forming contact holes contacted with the storage capacitor upper electrode (104) and the storage capacitor lower electrode (102), respectively, a first contact electrode (121) and a second contact electrode (122) for the storage capacitor upper electrode (104) and the lower electrode (102) are formed by filling with a conductive film. On this occasion, the first contact electrode (121) and the second contact electrode (122) use the same conductive material as a gate electrode (108). As soon as the first contact electrode (121) and the second contact electrode (122) are formed, the conductive material is deposited and patterned to form the gate electrode (108)(FIG. 4).

Then, a second interlayer insulating film (109) covering the first contact electrode (121), the second contact electrode (122), the gate electrode (108), and the gate insulating film (107) is deposited. Next, after forming contact holes contacted with the first contact electrode (121), a source area and a drain area of the channel area, and the second contact electrode (122), each contact hole is filled with metal while being patterned, to form a common electrode (131) contacted with the first contact electrode (121), a source electrode (132) contacted with the source area, and a drain electrode (133) contacted with the drain area and the second contact electrode (122). At this moment, it is desirable to fill the common electrode (131), the source electrode (132), and the drain electrode (133) with the same conductive metal (FIG. 5).

Next, a third interlayer insulating film (111) covering the common electrode (131), the source electrode (132), the drain electrode (133), and the second interlayer insulating film is deposited and planarized. After forming contact holes contacted with the common electrode (131) and the drain electrode (133), respectively, on the planarized third interlayer insulating film, the contact holes are filled with metal while being patterned, to form a connection electrode (142) for connecting an upper BM (141) with a pixel electrode (FIG. 6).

Then, after depositing a fourth interlayer insulating film (113) on the upper BM (141), the connection electrode (142), and the third interlayer insulating film (111), contact holes contacted with the connection electrode (142) are formed while a pixel electrode (114) is configured (FIG. 7). The pixel electrode is made of a transparent conductor, being generally formed with ITO (Indium Tin Oxide).

Among the steps suggested above, the step of forming the connection electrode (142) and the upper BM (141) suggested in the FIG. 6 is performed to improve display features, which is not an essential step. The upper BM is a factor for carrying out an additional function of cutting off a light incident on the channel area, and the connection electrode (142) functions as an intermediate medium for connecting the drain electrode (133) with the pixel electrode (114).

FIG. 8 is a cut sectional view for illustrating a lower substrate structure of a thin film transistor by one embodiment of the present invention, following the manufacturing methods suggested in FIG. 2 to FIG. 7. A difference between the lower substrate structure suggested in FIG. 7 and the lower substrate structure suggested in FIG. 8 is that a lower BM (104) configuring a storage capacitor upper electrode is formed in an upper area only of a storage capacitor lower electrode (102), thereby preventing a step difference from being created in the storage capacitor upper electrode. Therefore, compared to a prior storage capacitor upper electrode having a step difference, it can increase a breakdown voltage.

Another embodiment may be suggested by replacing a contacting method of the capacitor upper electrode and the lower electrode in the lower substrate structures illustrated in FIG. 7 and FIG. 8. That is, even though the capacitor lower electrode (102) is connected to the drain electrode (133) through the second contact electrode (122) while the capacitor upper electrode (104) is connected to the common electrode (131) through the first contact electrode (121) in FIG. 7 and FIG. 8, a liquid crystal panel as another embodiment may configure that the capacitor upper electrode (104) is connected to the drain electrode (133) through the second contact electrode (122) while the capacitor lower electrode (102) is connected to the common electrode (131) through the first contact electrode (121).

FIG. 9 to FIG. 14 are cut sectional views for illustrating a manufacturing process of a thin film transistor by one embodiment of the present invention. A storage capacitor lower electrode (102) is formed by depositing and patterning a conductive film such as doped poly silicon or metal silicide on a transparent substrate (101). Then, after forming a capacitor insulating film (103) by depositing an insulating film through thermal oxidation or CVD (Chemical Vaporized Deposition), a lower BM (104) for cutting off a light incident on a channel unit of the thin film transistor is formed by depositing and patterning a metal silicide film such as tungsten silicide (WSix) on the capacitor insulating film (103). At this point, the lower BM (104) is made of a conductive material to perform a function of a storage capacitor upper electrode (104) (FIG. 9).

After depositing a first interlayer insulating film (105) on the capacitor upper electrode (104) and the capacitor insulating film (103), contact holes contacted with the capacitor upper electrode (104) and the lower electrode (102) are formed. Then, a semiconductor film such as poly silicon is deposited on the first interlayer insulating film (105), while the contact holes are filled with the semiconductor film as being patterned to configure a first contact electrode (121) contacted with the capacitor upper electrode (104) and a second contact electrode (122) contacted with the capacitor lower electrode (102), respectively. At the same time, a channel area (106) of the thin film transistor is formed by patterning poly silicon deposited on the first interlayer insulating film (105) (FIG. 10). In this case, it is desirable to use poly silicon configuring the channel area (106) of the thin film transistor for the first contact electrode (121) and the second contact electrode (122).

A gate insulating film (107) is formed on the first contact electrode (121), the second contact electrode (122), the channel area (106), and the first interlayer insulating film (105). A gate electrode (108) is configured by depositing and patterning a conductive film on the gate insulating film (107). A second interlayer insulating film (109) is deposited on the formed gate insulating film (107) and the gate electrode (108) (FIG. 11).

Next, by opening a portion of the second interlayer insulating film, contact holes are formed in contact with the first contact electrode (121), a source area and a drain area of the channel area, and the second contact electrode (122). Then, each contact hole is filled with metal while being patterned, to form a common electrode (131) contacted with the first contact electrode (121), a source electrode (132) contacted with the source area, and a drain electrode (133) contacted with the drain area and the second contact electrode (122). At this time, it is desirable to fill the common electrode (131), the source electrode (132), and the drain electrode (133) with the same conductive metal (FIG. 12).

Next, a third interlayer insulating film (111) covering the common electrode (131), the source electrode (132), the drain electrode (133), and the second interlayer insulating film is deposited and planarized. After forming contact holes contacted with the common electrode (131) and the drain electrode (133), respectively, on the planarized third interlayer insulating film, the contact holes are filled with metal while being patterned, to form a connection electrode (142) for connecting an upper BM (141) with a pixel electrode (FIG. 13).

Then, after depositing and planarizing a fourth interlayer insulating film (113) on the upper BM (141), the connection electrode (142), and the third interlayer insulating film (111), contact holes contacted with the connection electrode (142) are formed to configure a pixel electrode (114)(FIG. 14).

Among the steps suggested above, the step of forming the connection electrode (142) and the upper BM (141) suggested in FIG. 13 is performed to improve display features, which is not an essential step. The upper BM is a factor for carrying out an additional function of cutting off a light incident on the channel area, and the connection electrode (142) functions as an intermediate medium for connecting the drain electrode (133) with the pixel electrode (114).

FIG. 15 is a cut sectional view for illustrating a lower substrate structure of a thin film transistor by one embodiment of the present invention, following the manufacturing methods suggested in FIG. 9 to FIG. 14. A difference between the lower substrate structure suggested in FIG. 14 and the lower substrate structure suggested in FIG. 15 is that the lower BM (104) configuring the storage capacitor upper electrode is formed in an upper area only of the storage capacitor lower electrode (102), thereby preventing a step difference from being created in the storage capacitor upper electrode. Accordingly, compared to a prior storage capacitor upper electrode having a step difference, it can increase a breakthrough voltage.

Another embodiment may be suggested by replacing the contacting method of the capacitor upper electrode and the lower electrode in the lower substrate structures of FIG. 14 and FIG. 15. That is, even though the capacitor lower electrode (102) is connected to the drain electrode (133) through the second contact electrode (122) while the capacitor upper electrode (104) is connected to the common electrode (131) through the first contact electrode (121) in FIG. 14 and FIG.

15, an LCD panel as another embodiment may configure that the capacitor upper electrode (104) is connected to the drain electrode (133) through the second contact electrode (122) while the capacitor lower electrode (102) is connected to the common electrode (131) through the first contact electrode (121).

FIG. 16 to FIG. 21 are cut sectional views for illustrating a manufacturing process of a thin film transistor by one embodiment of the present invention. After depositing and patterning a conductive film such as doped poly silicon or metal silicide on a transparent substrate (101), a storage capacitor lower electrode (102) is formed. Then, after forming a capacitor insulating film (103) by depositing an insulating film through thermal oxidation or CVD (Chemical Vaporized Deposition), a metal silicide film such as tungsten silicide (WSix) is deposited and patterned on the capacitor insulating film (103) to form a lower BM (104) for cutting off a light incident on a channel unit of the thin film transistor. At this moment, the lower BM (104) is made of a conductive material, to carry out a function of a storage capacitor upper electrode (104) while functioning as the lower BM (FIG. 16).

After depositing a first interlayer insulating film (105) on the capacitor upper electrode (104) and the capacitor insulating film (103), a semiconductor film such as poly silicon is deposited and patterned on the first interlayer insulating film (105) to configure a channel area (106) of the thin film transistor. Then, a gate insulating film (107) is formed on the first interlayer insulating film (105) and the channel area (106) (FIG. 17).

After forming a gate electrode (108) by depositing and patterning a conductive film on the gate insulating film (107) located on top of the channel area (106), contact holes are formed to open certain parts of the capacitor upper electrode (104) and the capacitor lower electrode (102). A second interlayer insulating film (109) is deposited to cover the gate insulating film (107), the gate electrode, and the formed contact holes (FIG. 18).

Next, by opening a certain part of the second interlayer insulating film (109), contact holes are formed in contact with the capacitor upper electrode (104), a source area and a drain area of a thin film transistor channel, and the capacitor lower electrode (102). Then, the contact holes are filled with metal while being patterned, to configure a common electrode (131) contacted with the capacitor upper electrode (104), a source electrode (132) contacted with the source area, and a drain electrode (133) contacted with the drain area and the capacitor lower electrode (102). At this time, it is desirable to fill the common electrode (131), the source electrode (132), and the drain electrode (133) with the same conductive metal (FIG. 19).

In the present invention, an opening process is once executed to open the capacitor first electrode (102) and the capacitor second electrode (104) after forming the gate oxide film (107) in the process suggested in FIG. 18, while a second opening process is executed to open the capacitor first electrode (102) and the capacitor second electrode (104) after forming the second interlayer insulating film (109) in FIG. 19. It is because the contact holes contacted with the capacitor first electrode (102) and the capacitor second electrode (104) cannot be smoothly formed with one-time opening process while the first interlayer insulating film and the second interlayer insulating film are accumulated.

Then, a third interlayer insulating film (111) covering the common electrode (131), the source electrode (132), the drain electrode (133), and the second interlayer insulating film is deposited and planarized. After forming contact holes contacted with the common electrode (131) and the drain electrode (133), respectively, on the planarized third interlayer insulating film, the contact holes are filled with metal while being patterned to configure a connection electrode for connecting an upper BM (141) with a pixel electrode (FIG. 20).

Next, after depositing a fourth interlayer insulating film (113) on the upper BM (141), the connection electrode (142), and the third interlayer insulating film (111), contact holes contacted with the connection electrode (142) are formed to configure a pixel electrode (114)(FIG. 21).

Among the steps suggested above, the step of forming the connection electrode (142) and the upper BM (141) suggested in the FIG. 20 is carried out to improve display features, which is not an essential step. The upper BM is a factor for performing an additional function of cutting off a light incident on the channel area, and the connection electrode (142) functions as an intermediate medium for connecting the drain electrode (133) with the pixel electrode (114).

FIG. 22 is a cut sectional view for illustrating a lower substrate structure of a thin film transistor by one embodiment of the present invention, following the manufacturing methods suggested in FIG. 16 to FIG. 21. A difference between the lower substrate structure suggested in FIG. 21 and the lower substrate structure suggested in FIG. 22 is that a lower BM (104) configuring a storage capacitor upper electrode is formed in an upper area only of a storage capacitor lower electrode (102), thereby preventing a step difference from being created in the storage capacitor upper electrode. Therefore, compared to a prior storage capacitor upper electrode having a step difference, it can increase a breakdown voltage.

Another embodiment may be suggested by replacing a contacting method of the capacitor upper electrode and the lower electrode in the lower substrate structures illustrated in FIG. 21 and FIG. 22. That is, even though the capacitor lower electrode (102) is connected to the drain electrode (133) while the capacitor upper electrode (104) is connected to the common electrode (131) in FIG. 21 and FIG. 22, a liquid crystal panel as another embodiment may configure that the capacitor upper electrode (104) is connected to the drain electrode (133) while the capacitor lower electrode (102) is connected to the common electrode (131).

The lower substrate of the thin film transistor manufactured according to the above manufacturing methods is united with the upper substrate, while a liquid crystal is injected, thereby completing the liquid crystal substrate using the thin film transistor.

INDUSTRIAL APPLICABILITY

According to an LCD panel using a thin film transistor and a manufacturing method thereof in accordance with the present invention, it can improve an opening ratio occupied by an area where a light is emitted on the entire screen, by configuring a storage capacitor and black matrices which increase sharpness by cutting off a light incident on a channel area of the thin film transistor in a channel lower section of the thin film transistor, and forming the thin film transistor for controlling a liquid crystal cell on an upper end of the storage capacitor to reduce a size that the light is cut off by the black matrices and the thin film transistor. Thus, it is possible to improve brightness regardless of sharpness of the LCD panel using the thin film transistor thanks to the improvement of the opening ratio, resulting in a manufacturing of a display device using a high-quality liquid crystal panel.

Though one of storage capacitor electrodes is formed side by side with a channel of a thin film transistor in a prior art, capacitor electrodes of the liquid crystal panel in accordance with the present invention can configure the liquid crystal panel located under the channel of the thin film transistor, that is, near to a transparent substrate. Accordingly, the capacitor electrodes formed on the liquid crystal panel in accordance with the present invention form contact holes by dividing them at least twice in order to form contacts without damage of a channel area of the thin film transistor, fill the contact holes with a metal material as a portion of a process for manufacturing a gate electrode while filling them with the same one as a material which configures the gate electrode in the embodiments of FIG. 7 and FIG. 8, and form the contact holes as a portion of a process for manufacturing a channel while filling them with poly silicon which configures the channel in the embodiments of FIG. 14 and FIG. 15, then form the contact holes as a portion of a process for manufacturing a source electrode and a drain electrode while filling them with metal which configures the source electrode and the drain electrode in the embodiments of FIG. 21 and FIG. 22. As a result, it is possible to minimize an additional process for forming contacts with the capacitor electrodes, reducing a lead time during a panel production.

In addition, the liquid crystal panel suggested in the present invention removes any step difference of a storage capacitor upper electrode, thereby proposing the liquid crystal panel using the thin film transistor which comprises a high breakdown voltage.

While the present invention has been described in connection with a number of embodiments and implementations, the present invention is not so limited but covers various obvious modifications and equivalent arrangements, which fall within the purview of the appended claims.

The invention claimed is:

1. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:
   a transparent substrate;
   a storage capacitor composed of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;
   a first interlayer insulating film deposited on the capacitor insulating film and the capacitor second electrode;
   a thin film transistor channel patterned on the first interlayer insulating film with a semiconductor film;
   a gate insulating film covering the first interlayer insulating film and the thin film transistor channel;
   a gate electrode patterned on the gate insulating film located on top of the thin film transistor channel with a first conductive material;
   a first contact electrode and a second contact electrode forming contact holes up to the capacitor first electrode and the second electrode from the gate insulating film, respectively, and electrically contacting with the capacitor first electrode and the second electrode, respectively, by filling the contact holes with the first conductive material;
   a second interlayer insulating film deposited on the first contact electrode, the second contact electrode, the gate electrode, and the gate insulating film;
   a common electrode forming contact holes connected to the first contact electrode, the second contact electrode, a source and a drain of a channel, respectively, by opening a predetermined area of the second interlayer insulating film, while being contacted with the first contact electrode formed by filling the contact holes with metal, a source electrode contacted with the source of the channel, and a drain electrode simultaneously contacted with the drain of the channel and the second contact electrode;
   a third interlayer insulating film deposited on the common electrode, the source electrode, the drain electrode, and the second interlayer insulating film; and
   a pixel electrode forming contact holes contacted with the drain electrode by opening a predetermined area of the third interlayer insulating film, and consisting of a transparent conductive material electrically contacted with the drain electrode.

2. The LCD panel of claim 1, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

3. The LCD panel of claim 1, wherein the capacitor second electrode is formed in an upper area only of the capacitor first electrode.

4. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:
   a transparent substrate;
   a storage capacitor consisting of a storage capacitor second electrode deposited and patterned on the transparent substrate with a conductive film, a capacitor insulating film deposited in predetermined thickness on the transparent substrate and the storage capacitor second electrode, and a capacitor first electrode opposite to the storage capacitor second electrode on the capacitor insulating film and comprising an opaque conductive material which cuts off an incident light;
   a first interlayer insulating film deposited on the capacitor insulating film and the capacitor first electrode;
   a thin film transistor channel patterned on the first interlayer insulating film with a semiconductor film;
   a gate insulating film covering the first interlayer insulating film and the thin film transistor channel;
   a gate electrode patterned on the gate insulating film located on top of the thin film transistor channel with a first conductive material;
   a first contact electrode and a second contact electrode forming contact holes up to the capacitor second electrode and the first electrode from the gate insulating film, respectively, and electrically contacting with the capacitor second electrode and the first electrode formed by filling the contact holes with the first conductive material;
   a second interlayer insulating film deposited on the first contact electrode, the second contact electrode, the gate electrode, and the gate insulating film;
   a common electrode forming contact holes connected to the first contact electrode, the second contact electrode, a source and a drain of a channel, respectively, by opening a predetermined area of the second interlayer insulating film, while being contacted with the first contact electrode by filling the contact holes with metal, a source electrode contacted with the source of the channel, and a drain electrode simultaneously contacted with the drain of the channel and the second contact electrode;

a third interlayer insulating film deposited on the common electrode, the source electrode, the drain electrode, and the second interlayer insulating film; and a pixel electrode forming contact holes contacted with the drain electrode by opening a predetermined area of the third interlayer insulating film, and comprising a transparent conductive material electrically contacted with the drain electrode.

5. The LCD panel of claim 4, wherein the capacitor first electrode is formed in an upper area only of the capacitor second electrode.

6. The LCD panel of claim 4, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

7. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:

a transparent substrate;

a storage capacitor consisting of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;

a first interlayer insulating film deposited on the capacitor insulating film and the capacitor second electrode;

a thin film transistor channel patterned on the first interlayer insulating film with a semiconductor film;

a first contact electrode and a second contact electrode contacting with contact holes contacted with the capacitor second electrode and the capacitor first electrode by opening a predetermined area of the first interlayer insulating film, while being contacted with the capacitor second electrode and the capacitor first electrode formed by filling the contact holes with the semiconductor film, respectively;

a gate insulating film deposited on the first contact electrode, the second contact electrode, the thin film transistor channel, and the first interlayer insulating film;

a gate electrode patterned on the gate insulating film located on top of the thin film transistor channel with a first conductive material;

a second interlayer insulating film deposited on the gate insulating film and the gate electrode;

a common electrode forming contact holes contacted with the first contact electrode, the second contact electrode, a source and a drain of the channel from the second interlayer insulating film, respectively, while being contacted with the first contact electrode by filling the contact holes with a conductive material, a source electrode contacted with the source, and a drain electrode electrically contacting with the drain and the second contact electrode;

a third interlayer insulating film deposited on the common electrode, the source electrode, the drain electrode, and the second interlayer insulating film; and a pixel electrode forming contact holes contacted with the drain electrode by opening a predetermined area of the third interlayer insulating film, and comprising a transparent conductive material electrically contacting with the drain electrode.

8. The LCD panel of claim 7, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

9. The LCD panel of claim 7, wherein the capacitor second electrode is formed in an upper area only of the capacitor first electrode.

10. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:

a transparent substrate;

a storage capacitor consisting of a storage capacitor second electrode deposited and patterned on the transparent substrate with a conductive film, a capacitor insulating film deposited in predetermined thickness on the transparent substrate and the storage capacitor second electrode, and a capacitor first electrode opposite to the storage capacitor second electrode on the capacitor insulating film and comprising an opaque conductive material which cuts off an incident light;

a first interlayer insulating film deposited on the capacitor insulating film and the capacitor first electrode;

a thin film transistor channel patterned on the first interlayer insulating film with a semiconductor film;

a first contact electrode and a second contact electrode contacting with contact holes contacted with the capacitor first electrode and the capacitor second electrode by opening a predetermined area of the first interlayer insulating film, while being contacted with the capacitor first electrode and the capacitor second electrode by filling the contact holes with doped silicon, respectively;

a gate insulating film deposited on the first contact electrode, the second contact electrode, the thin film transistor channel, and the first interlayer insulating film;

a gate electrode patterned on the gate insulating film located on top of the thin film transistor channel with a first conductive material;

a second interlayer insulating film deposited on the gate insulating film and the gate electrode;

a common electrode forming contact holes contacted with the first contact electrode, the second contact electrode, a source and a drain of the channel, respectively, from the second interlayer insulating film, while being contacted with the first contact electrode formed by filling the contact holes with a conductive material, a source electrode contacted with the source, and a drain electrode electrically contacting with the drain and the second contact electrode;

a third interlayer insulating film deposited on the common electrode, the source electrode, the drain electrode, and the second interlayer insulating film; and a pixel electrode forming contact holes contacted with the drain electrode by opening a predetermined area of the third interlayer insulating film and comprising a transparent conductive material electrically contacting with the drain electrode.

11. The LCD panel of claim 10, wherein the capacitor first electrode is formed in an upper area only of the capacitor second electrode.

12. The LCD panel of claim 10, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

13. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:

a transparent substrate;
a storage capacitor consisting of a storage capacitor first electrode deposited and patterned on the transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;
a first interlayer insulating film deposited on the capacitor insulating film and the capacitor second electrode;
a thin film transistor channel patterned on the first interlayer insulating film with a semiconductor film;
a gate insulating film deposited on the thin film transistor channel and the first interlayer insulating film;
a gate electrode patterned on the gate insulating film located on top of the thin film transistor channel with a first conductive material;
plural contact holes opened up to the capacitor first electrode and the capacitor second electrode from a predetermined area of the gate insulating film;
a second interlayer insulating film formed in a portion of the capacitor first electrode and the second electrode while being formed on the gate electrode and the gate insulating film through the plural contact holes;
contact holes formed to contact with the source and the drain of the channel from the second interlayer insulating film, a common electrode contacted with the capacitor second electrode formed by filling contact holes contacted with the capacitor first electrode and the second electrode and contact holes contacted with the source and the drain with a conductive material, a source electrode contacted with the source, and a drain electrode electrically contacting with the drain and the capacitor first electrode;
a third interlayer insulating film deposited on the common electrode, the source electrode, the drain electrode, and the second interlayer insulating film; and
a pixel electrode forming contact holes contacted with the drain electrode by opening a predetermined area of the third interlayer insulating film, and comprising a transparent conductive material electrically contacting with the drain electrode.

14. The LCD panel of claim 13, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

15. The LCD panel of claim 13, wherein the capacitor second electrode is formed in an upper area only of the capacitor first electrode.

16. An LCD panel for transmitting or cutting off a light through a change of a liquid crystal material array by interposing a liquid crystal material between a lower substrate consisting of a thin film transistor as a switching element and an upper substrate consisting of a common electrode, the lower substrate, comprising:

a transparent substrate;
a storage capacitor consisting of a storage capacitor second electrode deposited and patterned on the transparent substrate with a conductive film, a capacitor insulating film deposited in predetermined thickness on the transparent substrate and the storage capacitor second electrode, and a capacitor first electrode opposite to the storage capacitor second electrode on the capacitor insulating film and comprising a conductive material which absorbs a dispersed light;
a first interlayer insulating film deposited on the capacitor insulating film and the capacitor first electrode;
a thin film transistor channel patterned on the first interlayer insulating film with doped silicon;
a gate insulating film deposited on the thin film transistor channel and the first interlayer insulating film;
a gate electrode patterned on the gate insulating film located on top of the thin film transistor channel with a first conductive material;
plural contact holes opened up to the capacitor first electrode and the capacitor second electrode from a predetermined area of the gate insulating film;
a second interlayer insulating film formed in a portion of the capacitor first electrode and the second electrode while being formed on the gate electrode and the gate insulating film through the plural contact holes;
contact holes formed to contact with the source and the drain of the channel from the second interlayer insulating film, a common electrode contacted with the capacitor first electrode formed by filling contact holes contacted with the capacitor first electrode and the second electrode and contact holes contacted with the source and the drain with a conductive material, a source electrode contacted with the source, and a drain electrode electrically contacting with the drain and the capacitor second electrode;
a third interlayer insulating film deposited on the common electrode the source electrode, the drain electrode, and the second interlayer insulating film; and
a pixel electrode forming contact holes contacted with the drain electrode by opening a predetermined area of the third interlayer insulating film, and comprising a transparent conductive material electrically contacting with the drain electrode.

17. The LCD panel of claim 16, wherein the capacitor first electrode is formed in an upper area only of the capacitor second electrode.

18. The LCD panel of claim 16, wherein contact holes contacted with the common electrode are formed by opening a predetermined area of the third interlayer insulating film, and a light cutoff film patterned to cut off a dispersed light while being electrically contacted with the common electrode by being filled in the contact holes is further comprised.

19. In a method of manufacturing an LCD panel for transmitting or cutting off a light through a change of a liquid crystal material array by interposing a liquid crystal material between a lower substrate consisting of a thin film transistor as a switching element and an upper substrate consisting of a common electrode, a method for forming the lower substrate, comprising the steps of:

a first step of forming a storage capacitor consisting of a storage capacitor first electrode deposited and patterned on a transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;

a second step of depositing a first interlayer insulating film on the capacitor insulating film and the capacitor second electrode;

a third step of forming a thin film transistor channel by depositing and patterning a semiconductor film on the first interlayer insulating film;

a fourth step of forming a gate insulating film covering the first interlayer insulating film and the thin film transistor channel;

a fifth step of forming each contact hole up to the capacitor first electrode and the second electrode from the gate insulating film;

a sixth step of forming a first contact electrode and a second contact electrode electrically contacting with the capacitor first electrode and the second electrode, respectively, by patterning a gate electrode on the gate insulating film located on top of the thin film transistor channel with a first conductive material, and filling the formed contact holes with the first conductive material;

a seventh step of depositing a second interlayer insulating film on the first contact electrode, the second contact electrode, the gate electrode, and the gate insulating film;

an eighth step of forming a common electrode contacted with the first contact electrode by forming contact holes connected to the first contact electrode, the second contact electrode, a source and a drain of a channel, respectively, after opening a predetermined area of the second interlayer insulating film to fill the contact holes with metal, a source electrode contacted with the source of the channel, and a drain electrode simultaneously contacted with the drain of the channel and the second contact electrode;

a ninth step of depositing a third interlayer insulating film on the common electrode, the source electrode, the drain electrode, and the second interlayer insulating film; and a tenth step of forming a pixel electrode configuring contact holes contacted with the drain electrode by opening a predetermined area of the third interlayer insulating film and comprising a transparent conductive material electrically contacting with the drain electrode.

20. In a method of manufacturing an LCD panel for transmitting or cutting off a light through a change of a liquid crystal material array by interposing a liquid crystal material between a lower substrate consisting of a thin film transistor as a switching element and an upper substrate consisting of a common electrode, a method for forming the lower substrate, comprising the steps of:

a first step of forming a storage capacitor consisting of a storage capacitor first electrode deposited and patterned on a transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;

a second step of depositing a first interlayer insulating film on the capacitor insulating film and the capacitor second electrode;

a third step of forming a thin film transistor channel by depositing and patterning a semiconductor film on the first interlayer insulating film;

a fourth step of forming a gate insulating film covering the first interlayer insulating film and the thin film transistor channel;

a fifth step of forming each contact hole up to the capacitor first electrode and the second electrode form the gate insulating film;

a sixth step of forming a first contact electrode and a second contact electrode electrically contacting with the capacitor first electrode and the second electrode, respectively, by patterning a gate electrode on the gate insulating film located on top of the thin film transistor channel with a first conductive material, and filling the formed contact holes with the first conductive material;

a seventh step of depositing a second interlayer insulating film on the first contact electrode, the second contact electrode, the gate electrode, and the gate insulating film;

an eighth step of forming a common electrode contacted with the first contact electrode by forming contact holes connected to the first contact electrode, the second contact electrode, a source and a drain of a channel, respectively, after opening a predetermined area of the second interlayer insulating film to fill the contact holes with metal, a source electrode contacted with the source of the channel, and a drain electrode simultaneously contacted with the drain of the channel and the second contact electrode;

a ninth step of depositing a third interlayer insulating film on the common electrode, the source electrode, the drain electrode, and the second interlayer insulating film;

a tenth step of forming contact holes contacted with the common electrode and the drain electrode, respectively, by opening a predetermined area of the third interlayer insulating film, and forming a connection electrode connected to the drain electrode and an upper black matrix contacted with the common electrode by filling the contact holes with a conductive material; and an eleventh step of forming contact holes contacted with the connection electrode by opening a predetermined area of a fourth interlayer insulating film, after depositing the fourth interlayer insulating film on the upper black matrix, the connection electrode, and the third interlayer insulating film, and forming a pixel electrode consisting of a transparent conductive material electrically contacted with the connection electrode.

21. In a method of manufacturing an LCD panel for transmitting or cutting off a light through a change of a liquid crystal material array by interposing a liquid crystal material between a lower substrate consisting of a thin film transistor as a switching element and an upper substrate consisting of a common electrode, a method for forming the lower substrate, comprising the steps of:

a first step of forming a storage capacitor consisting of a storage capacitor first electrode deposited and patterned on a transparent substrate with a conductive film, a capacitor insulating film deposited in predetermined thickness on the transparent substrate and the storage capacitor first electrode, and a capacitor second electrode opposite to the storage capacitor first electrode on the capacitor insulating film and comprising an opaque conductive material which cuts off an incident light;

a second step of depositing a first interlayer insulating film on the capacitor insulating film and the capacitor second electrode;

a third step of forming contact holes contacted with the capacitor second electrode and the capacitor first electrode by opening a predetermined area of the first interlayer insulating film;

a fourth step of forming a thin film transistor channel by depositing/patterning a semiconductor film on the first interlayer insulating film, and forming a first contact electrode and a second contact electrode contacted with the capacitor second electrode and the capacitor first electrode respectively, by filling the contact holes with the semiconductor film;

a fifth step of depositing a gate insulating film on the first contact electrode, the second contact electrode, the thin film transistor channel, and the first interlayer insulating film;

a sixth step of patterning a gate electrode on the gate insulating film located on top of the thin film transistor channel with a first conductive material;

a seventh step of depositing a second interlayer insulating film on the gate insulating film and the gate electrode;

an eighth step of forming contact holes contacted with the first contact electrode, the second contact electrode, a source and a drain of the channel, respectively, from the second interlayer insulating film, and forming a common electrode contacted with the first contact electrode by filling the contact holes with a conductive material, a source electrode contacted with the source, and a drain electrode electrically contacted with the drain and the second contact electrode;

a ninth step of depositing a third interlayer insulating film on the common electrode, the source electrode, the drain electrode, and the second interlayer insulating film; and a tenth step of forming contact holes contacted with the drain electrode by opening a predetermined area of the third interlayer insulating film, and forming a pixel electrode consisting of a transparent conductive material electrically contacted with the drain electrode.

* * * * *